UNITED STATES PATENT OFFICE.

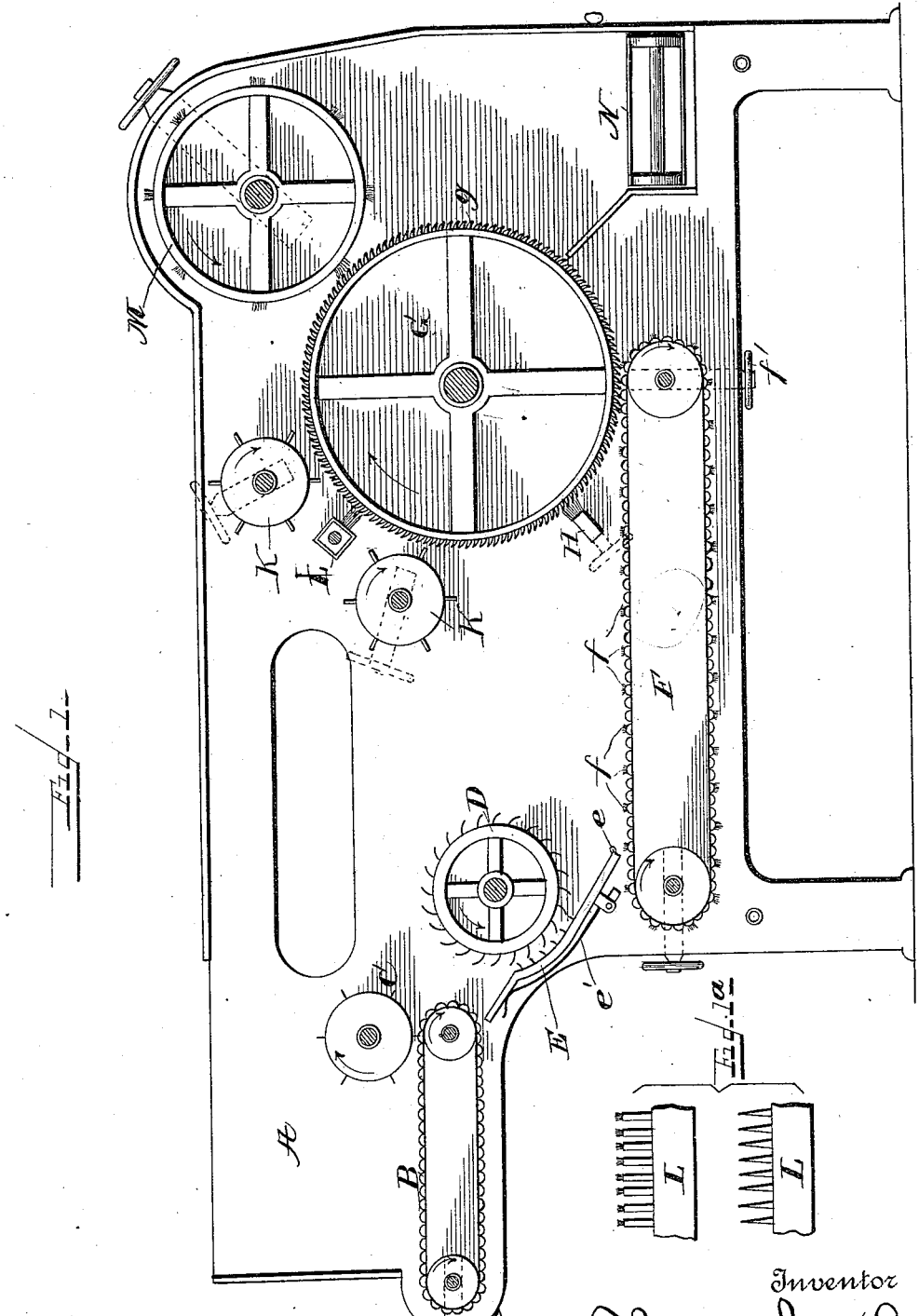

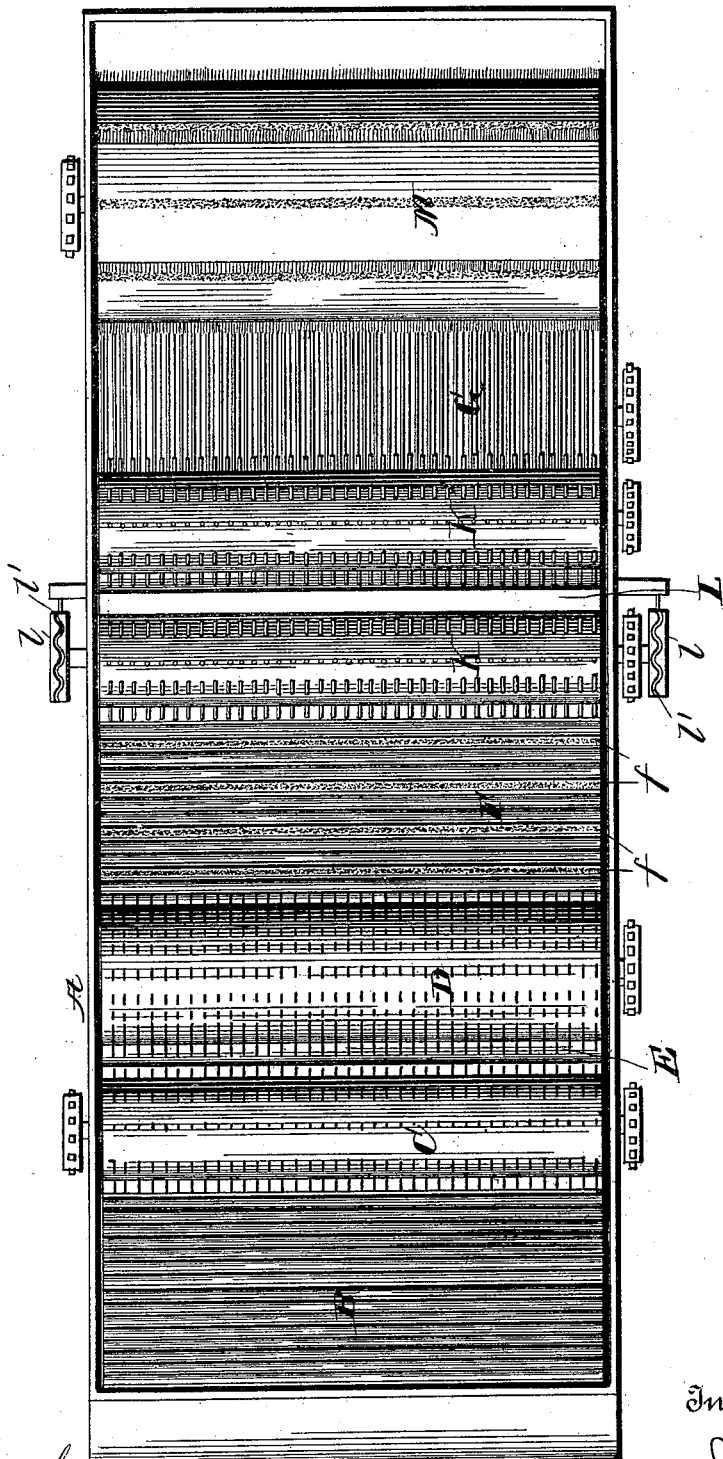

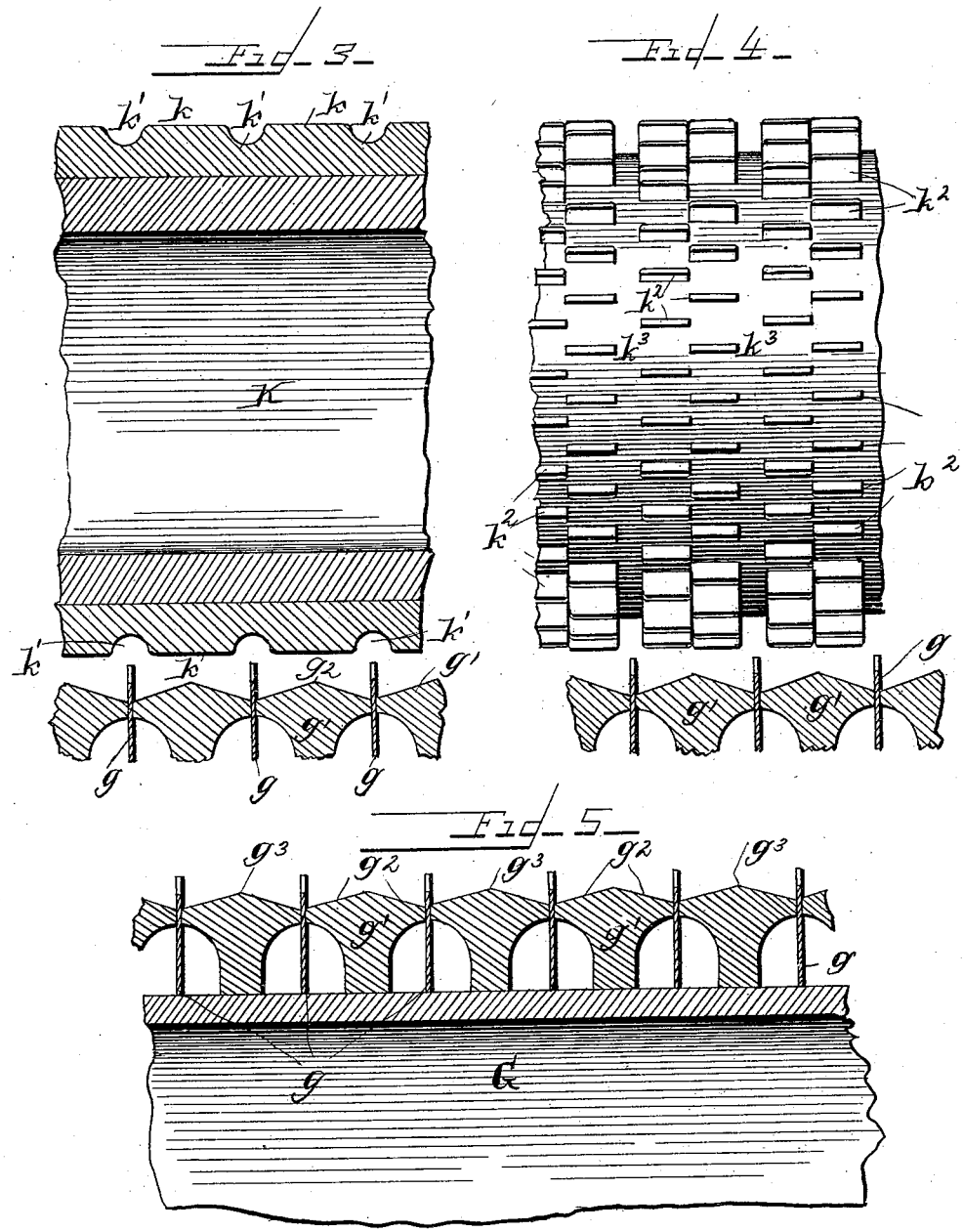

JAMES F. CUNNINGHAM, SR., OF ANSON, TEXAS, ASSIGNOR OF ONE-HALF TO THE J. I. CASE THRESHING MACHINE COMPANY, OF RACINE, WISCONSIN.

COTTON-CLEANER.

SPECIFICATION forming part of Letters Patent No. 463,330, dated November 17, 1891.

Application filed August 3, 1891. Serial No. 401,503. (No model.)

*To all whom it may concern:*

Be it known that I, JAMES F. CUNNINGHAM, Sr., a citizen of the United States, residing at Anson, in the county of Jones and State of Texas, have invented certain new and useful Improvements in Cotton-Cleaners; and I do hereby declare the following to be a full, clear, and exact description of the invention, such as will enable others skilled in the art to which it appertains to make and use the same.

My invention is an improvement in cotton-cleaning machines; and it consists in the novel features of construction and combination of parts hereinafter fully described.

In the accompanying drawings I have illustrated one form in which I have contemplated embodying my invention, and the said invention is fully disclosed in the following description and claims.

Referring to the said drawings, Figure 1 is a central longitudinal section of a machine for cleaning cotton embodying my improvements. Fig. 1ª shows slightly-modified forms of a part of the mechanism. Fig. 2 is a top plan view of the same. Fig. 3 is an enlarged sectional view of one of the beater-cylinders. Fig. 4 is a similar view of a slightly-modified construction of the beater-cylinder. Fig. 5 is an enlarged sectional view of a portion of the said cylinder, showing the method of constructing the same.

The object of my invention is to provide a machine for separating the hulls, limbs, leaves, and other foreign matter from the mass of cotton gathered by hand or by a cotton-harvesting machine and to crush and open the unopen bolls and separate the cotton therein from its hulls.

In the machine represented in the accompanying drawings, A represents the framework of the machine, which supports the operating parts and is provided with suitable bearings for the shafts of the mechanism.

The cotton as it is fed into or deposited in the machine falls upon the endless conveyer B, which carries it into engagement with the oppositely-rotating tooth-cylinder C, which lifts the cotton up, carries it over, and lets it fall into the crushing devices. The object of the roller C is to loosen the cotton and separate it before it passes to the crushing devices, so that it may be more advantageously acted upon.

The crushing devices consist of a ribbed or toothed roller D, which works in connection with the concave E and crushes the unopened bolls, thereby freeing the cotton contained therein. I prefer to provide the concave E with a ribbed or fluted surface to assist in crushing the unopened bolls, and in order that it may accommodate itself to the varying thickness of the cotton that passes through the crushing devices I prefer to give said concave a yielding movement. This may be accomplished in any desired way. I have shown the concave pivoted at or near one end, as at $e$, and provided with a spring resistance $e'$. After passing through the crushing devices the cotton falls upon an endless slatted carrier F, which consists, preferably, of a series of slats secured to endless bands, certain of said slats (as every second, third, or fourth) being provided with tufts, forming a brush $f$, as shown in the drawings, said brush extending the entire width of the carrier. I may use this carrier without the brushes $f$; but I prefer to employ them for a reason hereinafter disclosed. Above the rearward end of said carrier F is mounted a saw-cylinder G, provided with alternating saws $g$ and washers and rings $g'$, secured to said cylinder in any desired or customary manner. The washers $g'$ are of peculiar construction, the peripheral portions of each ring consisting of two faces $g^2$, meeting in an angular rib $g^3$. The rib $g^3$ is higher than adjacent portions of the ring, and the saws extend outwardly a considerable distance beyond the inner edges of faces $g^2$ $g^2$ and slightly beyond the higher portions or ribs $g^3$ of the flanges, as clearly shown in Fig. 5. The conveyer F passes beneath the lower surface of the said cylinder G and the shaft of the rear roller of said conveyer is provided with adjusting devices $f'$ of any desired form for adjusting the rear end of the conveyer toward and from the said cylinder. The cotton and foreign material in the conveyer F will be continually carried against the saws $g$ of the saw-cylinder G. The saws will catch the fibrous cotton, but the hard substances in said foreign material will not adhere readily to the saws, and will be pulled outward beneath the cylinder G by the endless carrier F. The brushes $f$ of the conveyer F will press the cotton onto the teeth of the saws and enable the saws to hold it more securely while passing the other devices provided for removing foreign materials from the same. The saws of the saw-cylinder will take up the cotton and some foreign materials adhering thereto or embedded therein, the rest of such foreign matter, as sticks, twigs, &c., not taken up by the saws being carried on past the saws by the conveyer and deposited in a part of the machine separate from the cotton-receptacle, from whence they may be removed in any desired manner and used for fuel or otherwise disposed of.

The devices for separating foreign matter from the cotton taken up by the saws are arranged around the said cylinder and are provided with suitable adjusting means for adjusting them radially toward or from said cylinder. These devices consist of the stationary brush H, two or more revolving beaters K K, and the endwise-reciprocating brush L, arranged intermediate of said beaters. The stationary brush H is so located with respect to the cylinder that it will press the cotton firmly into the saws, so that it will not be so easily knocked back by the beaters K K. When the brushes $f$ are used on the conveyer F, this brush H is not so necessary; but I prefer to employ it in addition to the brushes $f$. The brush H is also preferably provided with devices for adjusting it radially with respect to the cylinder G, as indicated in the dotted lines. The beaters K are cylinders or rollers provided with projections or flanges. These projecting portions may be formed by continuous flanges $k$, extending longitudinally of said rolls, as shown in Fig. 3, and in such case I prefer to provide said flanges with suitable notched, recessed portions $k'$ $k'$ in line with the saws, as shown, to allow room enough for a cotton-seed with the tuft of cotton adhering to it to pass the beater and remain in engagement with the saw. I may, however, accomplish this result in other ways. For instance, I may provide the roll K with alternating rows, spuds, or projections $k^2$, secured to the roller and having an open channel or space $k^3$ between two adjacent rows at intervals, as shown in Fig. 4. These beaters K K are for the purpose of beating back all sticks, hulls, and other foreign matter adhering to the cotton on the saws, but are designed to allow the cotton and cotton-seeds to pass by them.

It frequently happens that a stick, hull, or other piece of foreign material will be drawn longitudinally into the recess between two adjacent saws and will lie so low down upon the washer or ring that it would pass the first beater K. In order to prevent such matters from being carried entirely through the machine with the clean cotton, I provide the endwise-reciprocating brush L, which is mounted in suitable bearings to permit it to reciprocate longitudinally across the cylinder G. This brush L co-operates with the washers $g'$ of the said cylinder, which have the raised central rib $g^3$ and inclined faces $g^2$, as before described.

The brush L may be reciprocated by any preferred mechanism. I have shown in Fig. 2 a pair of rollers $l$ $l$, provided with cam-grooves $l'$ $l'$ for engaging a projection from said brush-shaft and effecting the reciprocation of the same. This brush L is located between the beaters K K, and as it is reciprocated back and forth across the surface of the cylinder G, if a stick or twig or other foreign matter should have been drawn into one of the recesses between two saws, as before described, and should have passed the first beater, the brush L will engage it and move it laterally, thus pushing it up onto one of the ribs $g^3$ or higher portions of the washers, where it can be struck by the second beater K and knocked back, and thus prevented from passing the machine with the cleaned cotton. By employing this construction the saw-teeth will be permitted to extend the requisite distance beyond adjacent portions of the rings or washers to properly engage the cotton, and at the same time the ribs or raised portions of the washers will extend into a higher plane and into a position where the materials thereon can be readily acted upon by the beaters. Instead of the brush L, I might employ a bar provided with fine pins or teeth, or I might employ a bar provided with a series of teeth provided at their extremities with brushes, (see Fig. 1$^a$,) as found most convenient. I may also employ a card-cylinder or cylinder provided with card clothing, instead of the cylinder G, or a cylinder provided with rows of hooks or teeth; but I prefer the construction before described. The cotton remaining on the cylinder G after passing the beaters will be free from foreign matters and will be stripped from the saws by the stripping-brush M and deposited in a suitable receptacle or upon an endless carrier N, by which it will be conveyed to a suitable receptacle. The brush M, like the beaters K K, is adjustable toward and from the cylinder G.

I do not desire to be limited to the exact details of construction herein shown and described, as variations may be made in the same without departing from the spirit of my invention.

What I claim, and desire to secure by Letters Patent, is—

1. In a cotton-cleaner, the combination, with the saw-cylinder, of an endless carrier provided with brushes, substantially as described.

2. In a cotton-cleaner, the combination, with the saw-cylinder, of an endless carrier provided at intervals with brushes, and adjusting devices for said carrier adjacent to said cylinder, substantially as described.

3. In a cotton-cleaner, the combination, with the saw-cylinder provided with saws and having peripheral portions between said saws located in different planes, of beaters, and the endwise-reciprocating brush engaging said cylinder forward of said beater, substantially as described.

4. In a cotton-cleaner, the combination, with the saw-cylinder, of two or more beaters having projecting portions and recesses, and the endwise-reciprocating brush intermediate of said beaters, substantially as described.

5. In a cotton-cleaner, the combination, with the saw-cylinder, of the feeding-conveyer provided with brushes, the beaters, and the endwise-reciprocating brush, substantially as described.

6. In a cotton-cleaner, the combination, with the saw-cylinder, of feeding devices therefor, the stationary brush engaging said cylinder, the beaters, and the endwise-reciprocating brush, substantially as described.

7. In a cotton-cleaner, a saw-cylinder consisting of a cylinder provided with an alternating series of saws and rings or washers, said rings or washers having portions intermediate the saws higher than portions adjacent to said saws, substantially as described.

8. In a cotton-cleaner, a saw-cylinder consisting of a cylinder provided with an alternating series of saws and rings or washers, said rings or washers having outer faces inclining to form a ridge intermediate said saws higher than other portions of said rings or washers adjacent to said saws, substantially as described.

9. In a cotton-cleaner, the combination, with the cotton-separating devices, of the crushing devices consisting of the crushing-roller and yielding concave, substantially as described.

In testimony whereof I affix my signature in presence of two witnesses.

JAMES F. CUNNINGHAM, SR.

Witnesses:
    CHARLES H. LEE,
    GEORGE L. EDDY.